(12) United States Patent
Claverie et al.

(10) Patent No.: US 8,749,942 B2
(45) Date of Patent: Jun. 10, 2014

(54) PROTECTIVE COVER FOR AN EARLY STREAMER EMISSION LIGHTNING ARRESTER

(75) Inventors: Malvina Claverie, Lannemezan (FR); Bruno Roland, Saint-Maur-des-Fosses (FR)

(73) Assignee: ABB France, Courtaboeuf (FR)

( * ) Notice: Subject to any disclaimer, the term of this patent is extended or adjusted under 35 U.S.C. 154(b) by 512 days.

(21) Appl. No.: 13/096,058

(22) Filed: Apr. 28, 2011

(65) Prior Publication Data
US 2011/0267733 A1 Nov. 3, 2011

(30) Foreign Application Priority Data

Apr. 30, 2010 (FR) .................................. 10 53388

(51) Int. Cl.
*H02H 9/00* (2006.01)
(52) U.S. Cl.
USPC .......................................................... 361/126
(58) Field of Classification Search
USPC .......................................................... 361/126
See application file for complete search history.

(56) References Cited

U.S. PATENT DOCUMENTS

| 6,108,187 A * | 8/2000 | Podporkin et al. ............ 361/117 |
| 6,804,106 B2 * | 10/2004 | Zhuang ......................... 361/230 |
| 7,390,169 B2 * | 6/2008 | Larsen et al. ............. 416/146 R |

OTHER PUBLICATIONS

Search Report dated Jun. 27, 2011, issued in the corresponding European Patent Application No. 11 16 1842.

* cited by examiner

*Primary Examiner* — Stephen W Jackson
(74) *Attorney, Agent, or Firm* — Buchanan Ingersoll & Rooney PC

(57) ABSTRACT

Dielectric protective cover for a lightning arrester with an early streamer emission device, wherein the lightening arrester includes an active portion for connection to the early streamer emission device for promoting a triggering of an upward leader from the active portion, a down conductor for connection to ground, and a dielectric portion for mounting the active portion on the down conductor, the active portion being separated from the down conductor by an air space formed as a spark gap through which lightning current will pass from the active portion to the down conductor, the protective cover comprising: a first portion for fastening to the active portion; and a second portion for fastening to the down conductor, wherein the protective cover protects dielectric properties of the spark gap against degradation in an environment of the spark gap, while leaving the active portion exposed to the environment.

20 Claims, 2 Drawing Sheets

PROTECTIVE COVER FOR AN EARLY STREAMER EMISSION LIGHTNING ARRESTER

RELATED APPLICATION

This application claims priority under 35 U.S.C. §119 to French Patent Application No. 10/53388 filed in France on Apr. 30, 2010, the entire content of which is hereby incorporated by reference in its entirety.

FIELD

The disclosure relates to the technical field of protecting against the direct effects of lightning using, for example, lightning arresters with an early streamer emission device (ESE lightning arrester). An exemplary ESE lightning arrester involves applying voltage pulses between the lightning arrester and earth to create an ionized space around a tip of the lightening arrester which will promote advance triggering of an upward leader from the tip to increase a likelihood of lightning striking the ESE lightning arrester. The upward leader, joining a downward leader from thunderclouds, ensures that lightning current will be passed to ground through the ESE lightning arrester.

BACKGROUND INFORMATION

A known structure of a lightning arrester with an ESE device can include an active portion which is mounted on a tip if the lightening arrester and is connected to the ESE device for applying voltage pulses to the active portion; a down conductor to be grounded; and a dielectric portion through which the active portion is mounted on the down conductor, the active portion being separated from the down conductor by an air space between them to form a spark gap with air through which the lightning current passes from the active portion to the down conductor.

Once installed on the site to be protected, ESE lightning arresters are placed in an external environment. As a result, the dielectric properties of the spark gap with air formed between the active portion and the down conductor may be degraded by environmental conditions.

For example, rainwater can be deposited on the dielectric portion of the ESE lightning arrester or even be suspended as droplets in the air of the spark gap of the lightning arrester. As a result, the level of electrical isolation between the active portion and the down conductor of the ESE lightning arrester is decreased due to the conductivity of rain water, which has the effect of degrading the performance of the ESE lightning arrester. In the limiting case, the active portion and the down conductor are short-circuited, preventing the application of voltage pulses to the active portion of the lightning arrester, in which case the ESE lightning arrester only operates as a simple Franklin rod.

In addition, air pollution can affect operation, such as when the ESE lightning arrester is mounted near factory chimneys, the chimneys of factories being frequently used as a high point of buildings for the layout of lightning arresters. The particles of pollution can remain suspended in the atmospheric air and therefore in the air space of the spark gap with air of the ESE lightning arrester, but they can be deposited on the dielectric portion of the ESE device. Such particles of pollution may also have some electrical conductivity leading to the deterioration of the insulation level of the spark gap with air of the ESE lightning arrester. It is also possible for insects to come to nest in the space between the active portion and the down conductor of the ESE lightning arrester forming the spark gap with air.

French patent application FR-A-2799585 discloses an active portion of an ESE lightning arrester which includes a metal bell-shape open at the bottom. Inside the bell-shape is a spark gap which is formed between it and a base connected to the down conductor. Similarly, the base is insulated from the bell-shape by an insulator which is also placed inside the bell. Thus, the spark gap and the insulation are protected to some extent from the environment.

However, this protection may not be satisfactory because water droplets can reach the spark gap and the insulation despite the bell, such as in the case of thunderstorms with swirling winds. The bell-shape does not prevent the penetration and deposition of particles such as in cases of air pollution, or the penetration of insects.

SUMMARY

A dielectric protective cover is disclosed for a lightning arrester with an early streamer emission device, wherein the lightening arrester includes an active portion for connection to the early streamer emission device for promoting a triggering of an upward leader from the active portion, a down conductor for connection to ground, and a dielectric portion for mounting the active portion on the down conductor, the active portion being separated from the down conductor by an air space formed as a spark gap through which lightning current will pass from the active portion to the down conductor, the protective cover comprising: a first portion for fastening to the active portion; and a second portion for fastening to the down conductor, wherein the protective cover protects dielectric properties of the spark gap against degradation in an environment of the spark gap, while leaving the active portion exposed to the environment.

An assembly is also disclosed, comprising: an early streamer emission device; an active portion of a lightning arrester connected to the early streamer emission device for promoting triggering of an upward leader starting from the active portion; a down conductor for connection to ground; a dielectric portion for mounting the active portion on the down conductor, the active portion being separated from the down conductor by an air space to form a spark gap with air through which lightning current will pass from the active portion to the down conductor; and a protective cover fastened to the lightning arrester to protect the spark gap against degradation of dielectric properties by an environment of the spark gap, the active portion of the lightning arrester being exposed to the environment.

BRIEF DESCRIPTION OF THE DRAWINGS

Other features and advantages of the disclosure will appear on reading the following detailed description of embodiments of the disclosure, given by way of example only and with reference to the drawings wherein.

DETAILED DESCRIPTION

Figure 1:
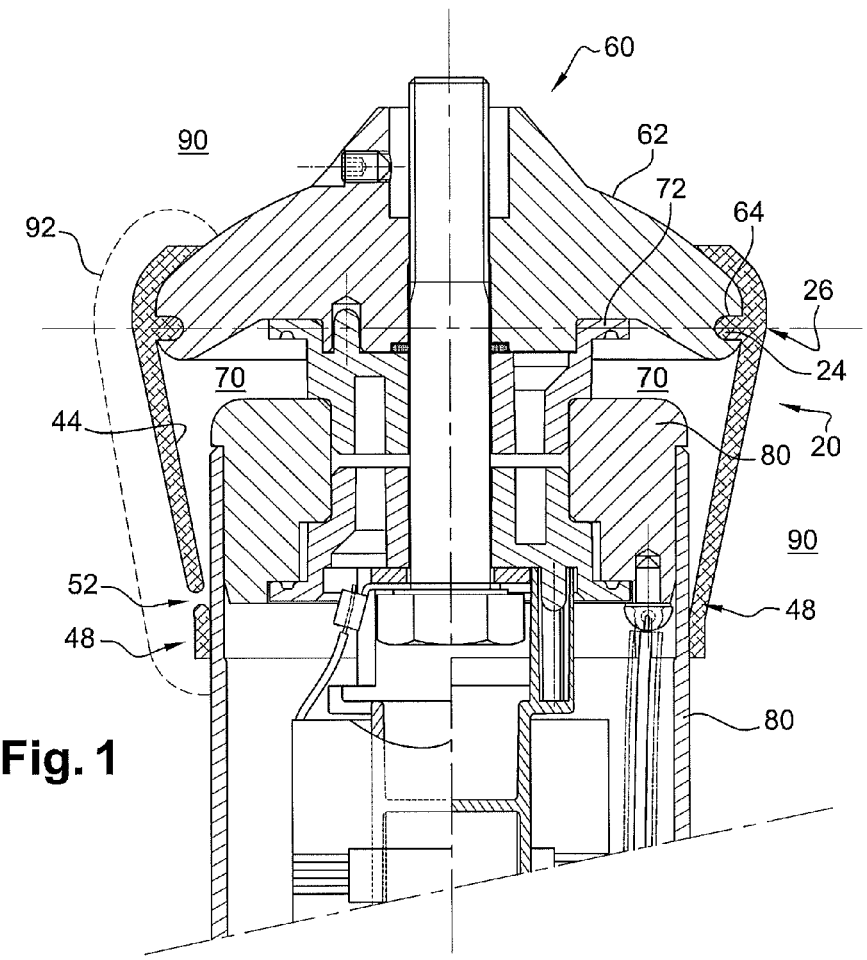
FIG. 1 shows a sectional view of a protective cover fastened to a lightning arrester according to an exemplary embodiment.

Exemplary embodiments as disclosed herein can improve the reliability of an ESE lightning arrester vis-à-vis a risk of degradation of dielectric characteristics of their spark gap by the environment.

According to exemplary embodiments, a dielectric protective cover is provided for a lightning arrester with an early streamer emission device having an active portion connected to the early streamer emission device to promote the triggering of an upward leader from the active portion, a down conductor to be grounded, and a dielectric portion through which the active portion is mounted on the down conductor, the active portion being separated from the down conductor by an air space to form between them a spark gap with air through which the lightning current passes from the active portion to the down conductor, the protective cover being configured to be fastened to the lightning arrester to protect the spark gap with air against degradation of its dielectric properties by the environment while leaving the active portion of the lightning arrester exposed to the environment.

According to an exemplary embodiment, the protective cover is configured to be fastened sealingly around a bottom periphery of the active portion of the lightning arrester.

According to an exemplary embodiment, the protective cover is configured to be fastened and sealed to a periphery of the down conductor.

According to an exemplary embodiment, the protective cover has an elastic property to hold it in place on the lightning arrester by clamping the elastic protective cover on the active portion of the lightning arrester and optionally on the down-conductor of the lightning arrester.

According to an exemplary embodiment, the protective cover comprises an annular projection on the inner face of the protective cover intended to be arranged on the active portion of the lightning arrester, the annular projection being provided for being housed in a corresponding groove of the active portion of the lightning arrester for fastening the protective cover on the lightning arrester.

According to an exemplary embodiment, the protective cover is made of EPDM and/or silicone.

According to an exemplary embodiment, the protective cover comprises at least one depression in the inner face of the portion of the protective cover to be engaged with the down-conductor of the lightning arrester to allow condensation forming in the spark gap with air to drain out of the protective cover.

According to an exemplary embodiment, the protective cover is of dimensions such that an isolation distance through the air between the active portion and the down conductor of the lightning arrester on the outside of the protective cover is greater than or equal to twice the isolation distance of the spark gap with air.

According to an exemplary embodiment, the protective cover is formed as a single part, the protective cover being designed to allow expanded air from the spark gap upon triggering thereof due to the lightning current to be discharged to the environment.

According to an exemplary embodiment, the protective cover is provided for discharge of the expanded air by passage thereof between the protective cover and the down conductor.

According to an exemplary embodiment, the protective cover has an elastic property to ensure elastic deformation of the protective cover as a result of the expansion of air in the spark gap with air upon triggering thereof by the lightning current to allow or promote passage of the expanded air between the protective cover and the down conductor.

According to an exemplary embodiment, the protective cover is formed as two separate (i.e., distinct) parts (e.g., first and second parts) for fastening the first part on the active portion of the lightning arrester and the second part on the down conductor of the lightning arrester, and being integrally formed or being joined together to form the protective cover, the two parts being configured in an exemplary embodiment to be separated by the expansion of air in the spark gap with air upon triggering thereof by the lightning current.

According to an exemplary embodiment, the second part can be adapted to change position under the effect of the expansion of the air in the spark gap with air upon triggering by the lightning current, for displaying the occurrence of a lightning strike on the lightning arrester as a result of it changing position.

According to an exemplary embodiment, the second part can be adapted to turn over the down conductor under the effect of the expansion of air in the spark gap with air upon triggering by the lightning current, for displaying the occurrence of a lightning strike on the lightning arrester.

According to an exemplary embodiment, the first part can be provided to form a bell-shape inside of which the dielectric portion and the spark gap with air are arranged when the first part is fastened to the active portion of the lightning arrester.

The disclosure further provides a kit, comprising:

a lightning arrester with an early streamer emission device, having an active portion connected to the early streamer emission device to promote the triggering of an upward leader from the active portion, a down conductor to be grounded;

a dielectric portion through which the active portion is mounted on the down conductor, the active portion being separated from the down conductor by an air space between them to form a spark gap with air through which the lightning current passes from the active portion to the down conductor; and a protective cover, provided to be fastened to the lightning arrester to protect the spark gap with air against degradation of its dielectric properties by the environment while leaving the active portion of the lightning arrester exposed to the environment.

Also disclosed is an assembly comprising a lightning arrester with an early streamer emission device, comprising:

an active portion connected to the early streamer emission device to promote the triggering of an upward leader starting from the active portion, a down conductor to be grounded, and a dielectric portion through which the active portion is mounted on the down conductor, the active portion being separated from the down conductor by an air space between them to form a spark gap with air through which the lightning current passes from the active portion to the down conductor, and a protective cover, which is fastened to the lightning arrester to protect the spark gap with air against degradation of its dielectric properties by the environment, the active portion of the lightning arrester being exposed to the environment.

The disclosure therefore relates to a dielectric protective cover to be attached to a lightning arrester with an ESE device. The ESE lightning arrester may be of any known type, comprising:
- an active portion connected to the ESE device to promote the triggering of an upward leader from the active portion,
- a down conductor to be grounded, and
- a dielectric portion through which the active portion is mounted on the down conductor, the active portion being separated from the down conductor by an air space between them to form a spark gap with air through which the lightning current passes from the active portion to the down conductor.

The active portion and the down conductor are the two electrodes of the spark gap with air.

The protective cover can be adapted to the ESE lightning arrester so as to be fastened to the lightning arrester while leaving the active portion of the lightning arrester exposed to the environment. The fastening of the protective cover on the ESE lightning arrester does thus not interfere with the operation of the active portion of the ESE lightning arrester that can create an ionized space in the environment near the active portion.

Moreover, the protective cover can be adapted to the ESE lightning arrester so that the fastening of the protective cover on the ESE lightning arrester protects the spark gap with air of the lightning arrester. This protection of the spark gap with air of the ESE lightning arrester can be ensured against degradation by the environment of the dielectric properties of the spark gap with air.

This is made possible by the nature of the dielectric protective cover. For example, due to its dielectric property, the protective cover can be arranged near or in contact with various electrodes of the spark gap with air without shorting the electrodes of the spark gap with air formed between the active portion and the down conductor, nor will it degrade its dielectric properties. This ability of arranging the protective cover close to the active portion and the down conductor makes it possible to reduce the surface area of fluid communication (the area of the surface for exchange) between the air in the air space and the air outside the protective cover. The protective cover can be then adapted to enclose the air space of the spark gap with air so as to reduce substantially its fluid communication with air outside the protective cover. Therefore, the penetration of water droplets, insects or particles of pollution in the air space inside the protective cover can be reduced or completely prevented by the reduction of exchange between the air space and outside air. Ultimately, because of its dielectric nature, the protective cover can be made and arranged on the ESE lightning arrester to obtain adequate protection of the spark gap with air against degradation by the environment through reducing the fluid communication between the air space of the spark gap with air and the outside air.

Compared to the ESE lightning arrester disclosed in FR-A-2799585, the proposed protective cover can significantly improve the protection of the ESE lightning arresters against degradation by the environment. For example, in known devices, the protective bell cannot be arranged close to the down conductor or in contact with it since the distance between them is imposed by the isolation distance of the spark gap with air formed between them. Moreover, the protective cover proposed by the disclosure can naturally be used on an ESE lightning arrester in accordance with FR-A-2799585 to improve its reliability.

FIG. 1 illustrates a sectional view of a first exemplary embodiment of the protective cover of the disclosure. The geometry of the protective cover 20 and the ESE lightning arrester 60 has here symmetry of revolution about the axis denoted by 'V' in FIG. 1.

Figure 2:
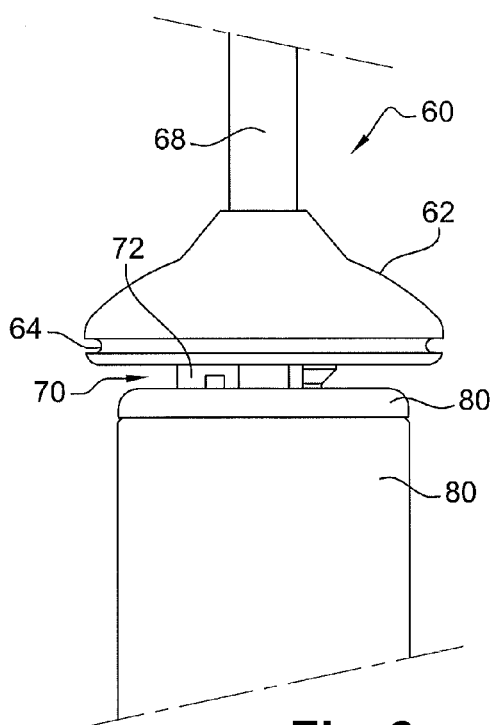
FIG. 2 is a diagram of an exemplary ESE lightning arrester on which the protective cover of FIG. 1 can be fastened.

FIG. 2 shows a view of the ESE lightning arrester on which the protective cover can be fastened. The down conductor to ground 80 is arranged at the bottom of the ESE lightning arrester 60 so as to be easily connected to the earth. The active portion 62 is mounted on the down conductor 80 through the dielectric portion 72 (e.g., a part of electrically insulating material or an assembly of parts that is electrically insulating). The dielectric portion 72 allows the separation of the active portion 62 and the down conductor 80 by the air space 70 forming the spark gap of the ESE lightning arrester 60. The dielectric portion 72 of the ESE lightning arrester and the air space 70 provide electrical isolation of the active portion 62 relative to the down conductor 80. The active portion 62 of the ESE lightning arrester 60 may include an upwardly-directed spike 68 to improve the point effect of the ESE lightning arrester.

The ESE lightning arrester comprises, as is known, a triggering device as a means for applying voltage spikes to the active portion 62 for creating an ionized space around the tip 68.

FIG. 1 shows the protective cover 20 fastened to the ESE lightning arrester 60 so as to leave the active portion 62 of the ESE lightning arrester exposed to the environment.

According to the exemplary embodiment illustrated in FIG. 1, the protective cover 20 can form a single part, which can have an advantage of providing a single protective cover economical to manufacture and simple to implement on ESE lightning arresters. The protective cover 20 has a sleeve-shape here. The protective cover 20 is fastened to the outer periphery of the lightning arrester 60 forming an assembly of the protective cover 20 with the ESE lightning arrester 60. The dimensions of the protective cover 20 before assembly can be selected to achieve fastening over the ESE lightning arrester 60, by elastically deforming the protective cover 20.

FIG. 1 shows that a top portion 26 of the protective cover 20 is fastened to the active portion 62 of the ESE lightning arrester 60. The top portion 26 of the protective cover 20 has, before its fastening to the active portion 62, an inner diameter smaller than the outside diameter of the active portion 62 of the ESE lightning arrester 60. The elastic deformation of the protective cover 20 provides an effective clamping of the protective cover 20 on the active portion 62. The elastic deformation of the protective cover 20 on the active portion 62 also ensures the sealed fastening of the protective cover 20 on the periphery of the active portion of the ESE lightning arrester. As a supplementary or alternative measure, the protective cover 20 can include a projection 24 on the inner face (or inside wall) of the protective cover 20. The projection 24 is then housed in a groove 64 provided for example on the active portion 62 of the ESE lightning arrester 60, for effective clamping of the protective cover 20 on the ESE lightning arrester. Given the symmetry of revolution, the groove 64 and projection 24 may have a circular shaping, while the projection 24 is annular.

Similarly, a lower portion 48 of the protective cover 20 can be fastened to the down conductor 80, as shown in FIG. 1. The lower portion 48 of the protective cover 20 can have, before its fastening to the down conductor 80, an inside diameter that is smaller than the outside diameter of the down conductor 80 of the ESE lightning arrester 60, to allow fastening by elastic deformation. The elastic deformation of the lower portion 48 allows the protective cover 20 to be sealingly fastened on a periphery of the down conductor 80.

Alternatively to the embodiment of FIG. 1, an exemplary protective cover 20 can be fastened to the active portion 62 by the top portion 26 without being fastened to the down conductor 80. The protective cover 20 in this case is fully supported by the active portion 62. The lower portion 48 of the protective cover extends away from the down conductor 80 while being sufficiently close to the down conductor 80 to limit fluid communication between air space 70 and the air 90 outside the protective cover 20. In order to further reduce exchange between the air space 70 and outside air 90, the lower portion 48 may be arranged around down conductor 80 with a small degree of clearance, or even be arranged in contact with it.

Nevertheless, an exemplary desired level of sealing of the fastening to the down conductor 80 advantageously does not prevent providing at least one drain channel 52 for draining out condensation from air in the air space 70 to outside of the protective cover. The air space 70, although separated from the outside air 90, is subject to variations in atmospheric temperature. It is possible that the moisture in the air space 70 will get condensed to form liquid water. The presence of liquid water inside the protective cover 20 can prevent proper operation of the spark gap. The drain channel 52 for condensed water is arranged, for example, at the lower portion 48 of the protective cover 20. Thus, by sealing of the fastening of the lower portion 48 on the down conductor 80, it is appropriate to provide a level of sealing sufficient to prevent or substantially limit the intrusion inside the protective cover 20 of droplets of water suspended in the air, which is not incompatible with the provision in the protective cover 20—or optionally in the down-conductor 80—of at least one drain channel 52 for draining out condensation form air to outside of the protective cover 20. Such a degree of sealing is also sufficient to prevent or reduce substantially penetration of particles of pollution, and similarly intrusion of insects.

Figures 3, 4:
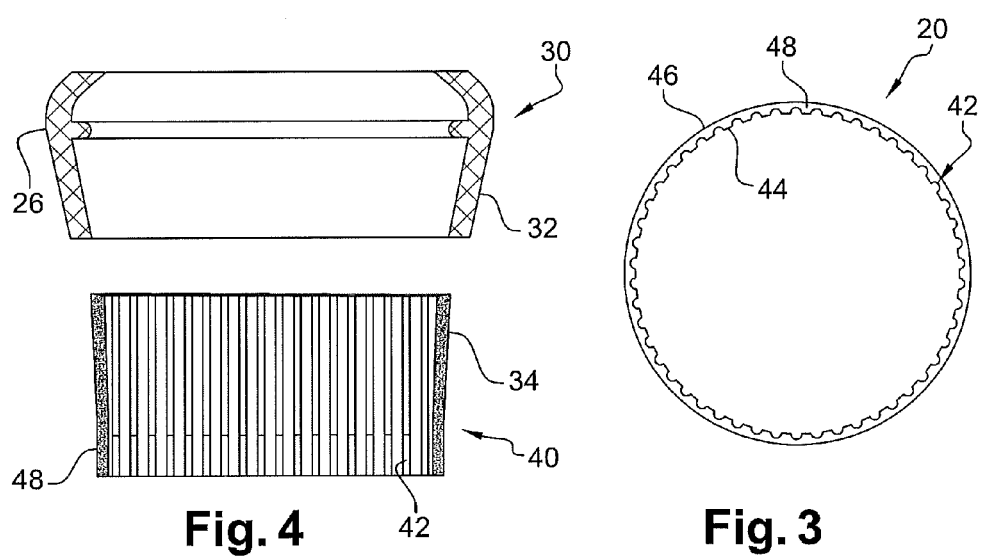
FIG. 3 is a bottom view of the lower portion of the exemplary protective cover of FIG. 1.
FIG. 4 is a sectional view of a protective cover according to another exemplary embodiment.

It can be advantageous to provide a plurality of drain channels 52 in the form of depressions or grooves. FIG. 3 shows a bottom view of the lower portion 48 of the protective cover 20. This figure shows that depressions 42 are formed in the inner surface 44 of the lower portion 48 of the protective cover 20. The grooves can be implemented simply by vertical recesses in the protective cover 20. These depressions extend along the inner surface of the portion 48 of the protective cover 20 in contact with the down conductor 80 from inside the protective cover 20 to the outside of the protective cover. In this way, the draining out of condensation from the air space 70 is not carried by a through-hole passing right through the protective cover 20. In the absence of a through-hole in the protective cover 20, the ability of protective cover 20 to withstand mechanical stress can be improved.

FIG. 4 illustrates an exemplary embodiment of the protective cover 20 made in two separate parts 30 and 40. Parts 30 and 40 have here the form each of a sleeve. For this alternative embodiment, the same characteristics described above are identified by the same reference numerals. The first part 30 comprises the top portion 26 of the protective cover 20 and the second part 40 comprises the lower portion 48 of the protective cover 20. The first part 30 is thus provided to be fastened to the active portion 62 of the ESE lightning arrester 60, while the second part 40 is provided to be fastened to the down conductor 80.

Figure 5:
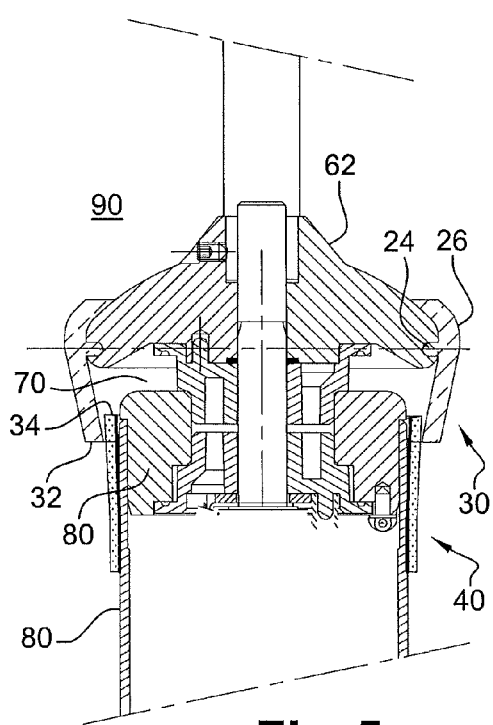
FIGS. 5, 6 and 7 are successive views of the exemplary protective cover of FIG. 3 before triggering of a spark gap, during discharge of expanded air from the triggering of the spark gap, and after triggering of the spark gap.

FIG. 5 shows a view of the protective cover 20 in two parts 30 and 40 fastened to the ESE lightning arrester 60. As in FIG. 1, the protective cover 20 and the ESE lightning arrester 60 of FIG. 5 shows symmetry of revolution about the vertical axis denoted by 'V'.

After assembly of the protective cover 20 and the ESE lightning arrester 60 by fastening of parts 30 and 40, parts 30 and 40 join together to protect the spark gap with air from degradation by the environment. The air space 70 is thus surrounded by the protective cover 20 in substantially sealed fashion. Part 30 is adapted to be fastened to the active portion 62 of the ESE lightning arrester 60 so as to leave the active portion 62 of the ESE lightning arrester 60 exposed to the environment. Part 40 is adapted to be fastened to the down conductor 80. The fastening of parts 30 and 40 on, respectively, the active portion 62 and the down conductor 80 may be done elastically as mentioned for the protective cover of FIG. 1.

According to the two previous exemplary embodiments, the protective cover 20 then extends from the active portion 62 to the down conductor 80. In this way, the air space 70 between the active portion 62 and the down conductor 80 and the dielectric portion 72 are separated from atmospheric air 90 located outside of the protective cover 20.

FIGS. 1 and 5 illustrate the ESE lightning arrester 60 equipped with the protective cover 20. However, assembly of the protective cover 20 on the ESE lightning arrester 60 can advantageously be done on site, the protective cover 20 and the ESE lightning arrester 60 being able to be delivered as a package ready for assembly (or kit).

Fastening the protective cover 20 of the ESE lightning arrester can lead to the air space 70 being separated from the air 90 located outside of the protective cover 20. FIGS. 1 and 5 show that the isolation distance between the active portion 62 and the down conductor through the air 90 on the outside of the protective cover 20 is greater than or equal to twice the insulation distance of air space 70. The outside air 90 has dielectric properties (that is to say, electrical insulation properties) that may be altered by rainfall and pollution in the atmosphere. However, as the protective cover 20 is dielectric, the length of the arc 92 able to be formed in the outside air 90 is greater than the height of protective cover 20, as shown in FIG. 1. The outside air 90 then provides an isolation distance equal to the height of the protective cover 20. The choice of the length of the protective cover 20 after mounting on the ESE lightning arrester 60 allows the maintenance of a sufficient electrical insulation between the active portion 62 and the down conductor 80 to accommodate alterations in insulating characteristics of the outside air 90. For the same purpose, the cover material 20 can be advantageously chosen to exhibit a hydrophobic character to prevent trickling or deposition of water droplets on the outer surface of the protective cover 20. Moreover, the protective cover 20 can have a surface smooth enough to limit the deposition of pollution particles on the outer surface of the protective cover 20.

Ultimately, all elements extending between the active portion 62 and the down conductor 80 can, for example, be either preserved from weathering (this is the case of the air in the spark gap with air and the dielectric portion 72) or exhibit sufficient electrical insulation despite weathering (this is the case for the protective cover 20).

In the case of a lightning strike, breakdown or triggering of the spark gap of the ESE lightning arrester 60 causes a very rapid heating of the air space 70. This heating of the air space 70 separated from the outside air 90 by the protective cover 20 causes mechanical stress on protective cover 20 resulting from the expansion of the air space 70.

The protective cover 20 is, for example, made of elastic material for elastic deformation of the protective cover 20 when subjected to mechanical stress from the expanded air space 70. Deformation which is purely elastic of the protective cover 20 allows holding of the function of the protective cover 20 after the occurrence of a first lightning strike.

From this point of view, the elastic material of the protective cover 20 has an elongation at yield which is, for example, greater than or equal to 300%. Ethylene-propylene-diene monomer (EPDM), or silicone are elastic materials especially suited for making the protective cover 20. The silicone used can have the following exemplary properties: a tensile strength of 7.3 MPa, elongation at break of 500% in terms of standard NFT 46-002 and a Shore A hardness of 60 as defined in standard NFT 46-052. The EPDM used can have the following characteristics: a tensile strength of 7.5 MPa and an elongation at break of 680% in terms of standard NFT 46-002. The EPDM and silicone have, in addition to elasticity, exemplary advantageous properties for use as a protective cover for an ESE lightning arrester. They thus possess a smooth surface, good electrical insulation and good resistance to aging. In the embodiment of the protective cover 20 formed with two separate parts 30 and 40, parts 30 and 40 may be made of a different material. Part 30 is, for example, made of EPDM, while part 40 is, for example, made of silicone with shore A hardness of 60.

As previously discussed, the elasticity of the protective cover 20 can ensure the fastening of the protective cover 20 to the ESE lightning arrester in a resilient fashion while providing a sealing fastening.

In addition, the design of the protective cover 20 can be adapted to provide an elastic deformation of the protective cover 20 for discharge into the atmosphere of a portion of the air expanded in the air space 70.

Adaptation of the design may include (e.g., consist of) on the one hand making the protective cover in an elastic material and on the other hand, choosing an adapted geometry of the protective cover 20.

The geometry and/or elasticity of the protective cover 20 may be selected to ensure that the expanded air is discharged as a result of passing between the protective cover 20 and the down conductor 80. To this end, fastening of the protective cover 20 on the active portion 26 may exhibit, as a result of expansion of the air, an elastic deformation lower than the elastic deformation of the fastening of the protective cover 20 on down conductor 80. The expanded air then discharges by the detachment of the lower portion 48 relative to the down conductor 80 with which the lower portion 48 of the protective cover 20 is normally in contact. The expanded air is discharged into the atmosphere and along the down conductor 80 to the bottom, although the air having been heated by the triggering of the spark gap, tends to rise to the level of the top portion of the ESE lightning arrester 60 constituted by the active portion 62. For example, the protective cover 20 can have a sufficient clamping force on the active portion 62 of the ESE lightning arrester 60 to ensure the holding of the assembly of the protective cover 20 on the ESE lightning arrester 60 despite mechanical stresses. In this way, the function of preserving of the protective cover 20 against alteration by the environment is ensured over a long period of time without requiring intervention on the protective cover 20 for newly fastening the protective cover on the ESE lightning arrester after each lightning strike.

In the embodiment of the protective cover 20 in FIG. 1, the protective cover 20 is made of elastic material to allow air that has expanded to discharge as well as to withstand mechanical stress at the point of fastening to the active portion 62.

The protective cover 20, in the embodiment illustrated in FIG. 5, has a geometry adapted to allow the discharge of the expanded air in case of triggering of the spark gap 62 with air.

Figure 6:
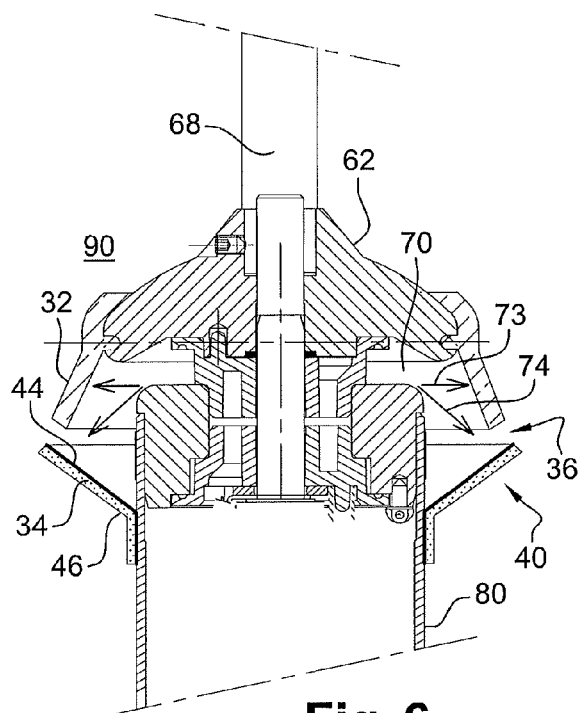
Figure 7:
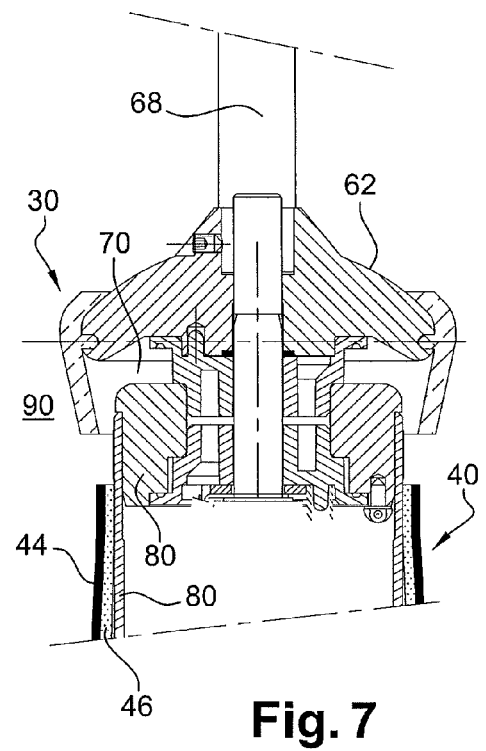

FIGS. 5, 6 and 7 show successive views of the protective cover 20 in two parts 30 and 40 during the occurrence of triggering of the spark gap. Before the triggering, part 30 has a portion 32 overlapping, at least in part, a portion 34 of part 40, as shown in FIG. 5. In other words, the portion 32 surrounds the portion 34, which prevents the accumulation of water at the juncture of these two portions and the risk of water trickling inside the protective cover 20. Consequently, before triggering, the air space 70 is well separated from the air outside 90 by the protective cover 20. Referring to FIG. 6, upon triggering of the spark gap with air, the air space 70 expands and imposes deformation of part 30 in a direction of arrow 73 and a deformation of part 40 in a direction of arrow 74. The deformation of the two parts 30 and 40 then cause the separation of portions 34 and 32 which were originally joined. This separation allows the formation of an opening 36 for discharging the expanded air following triggering of the spark gap with air. It will be understood that the position of the parts 30 and 40 in FIG. 6 is an intermediate position that does not correspond to a stable position.

After triggering of the spark gap, parts 30 and 40 can, by elastic deformation, return to the configuration shown in FIG. 5. The portions 32 and 34 are then joined to each other again, which again separates the air space 70 from the outside air 90. The function of preserving the ESE lightning arrester from degradation by the environment is then ensured despite the occurrence of a first triggering of the spark gap with air of the ESE lightning arrester. Nevertheless, the point where the two parts 30 and 40 join may exhibit a slightly different position from the initial position illustrated in FIG. 5. Thus the initial overlapping of part 40 by part 30 may now have become, after a first triggering, overlapping of part 30 by part 40, corresponding to the situation where part 40 has passed over part 30, such that the portion 34 surrounds the portion 32.

According to an alternative exemplary embodiment, parts 30 and 40 after triggering do not return to the initial configuration of FIG. 5, but rather parts 30 and 40 remain separated. FIG. 7 illustrates this new configuration showing where the parts 30 and 40 may be after triggering of the spark gap. Part 30 is returned to the initial position of FIG. 5 while part 40 is in a new position. Part 40 then has two positions of fastening on down conductor 80. The first position of fastening of part 40 corresponds to the position shown in FIG. 5 in which part 40 and part 30 are joined together. The second position of fastening of part 40 corresponds to the position shown in FIG. 7. After a first triggering, part 40 keeps the position shown in FIG. 7.

To switch position from the position shown in FIG. 5 to the position shown in FIG. 7, part 40 has been turned over along the down conductor 80 under the effect of the expansion of the air. Indeed in the first position and with reference to FIG. 6, part 40 has an inner face 44 facing down conductor 80 and an outer face 46 facing the outside air 90. In the second position and with reference to FIG. 7, it is the outer face 46 that is facing down conductor 80 while it is the inner face 44 that is facing the outside air 90.

Depending on the power of the lightning, the expansion of air results in complete turning over of part 40, as shown in FIG. 7, or partial turning over of part 40, not shown. The partial turning over of part 40 corresponds to portion 34 folding down on the lower portion 48, the lower portion remaining fastened to the down conductor 80. Part 40 is thus folded in two along down conductor 80.

The turned-over position of part 40 characterizes the occurrence of a lightning strike on the ESE lightning arrester. Simply looking at the position of part 40 then determines the occurrence of a lightning strike on the ESE lightning arrester 60. The inner surface 44 may have a visible pattern or a color in order to improve viewing from a distance of the occurrence of a lightning strike on the ESE lightning arrester 60. As a supplementary or alternative measure, an indicator, such as a brightly colored ribbon, not shown, can be arranged inside the protective cover 20 so as to be visible from the outside when part 40 has turned over on the down conductor 80.

After the occurrence of a lightning strike, the portion 34 of part 30 is, for example, adapted to be sufficiently close to the down conductor 80 so that after an initial triggering of the spark gap with air, the air space 70 is still protected against degradation caused to the environment. Referring to FIG. 7, part 30 thus forms a bell-shape inside which the dielectric portion 72 and the spark gap 70 are arranged. The lower edge of the bell-shape is near the down-conductor 80, for example, at a distance less than the distance of the dielectric insulation of the spark gap with air, which ensures adequate protection of the spark gap with air and its dielectric portion 72.

Of course, the present disclosure is not limited to the examples and embodiments described and illustrated, and may be the object of numerous variations accessible to those skilled in the art.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Dielectric protective cover for a lightning arrester with an early streamer emission device, wherein the lightning arrester includes an active portion for connection to the early streamer emission device for promoting a triggering of an upward leader from the active portion, a down conductor for connection to ground, and a dielectric portion for mounting the active portion on the down conductor, the active portion being separated from the down conductor by an air space formed as a spark gap through which lightning current will pass from the active portion to the down conductor, the protective cover comprising:
   a first portion for fastening to the active portion; and
   a second portion for fastening to the down conductor, wherein the protective cover protects dielectric properties of the spark gap against degradation in an environment of the spark gap, while leaving the active portion exposed to the environment.

2. Protective cover according to claim 1, comprising:
   a fastening for sealing a bottom periphery of the active portion of the lightning arrester.

3. Protective cover according to claim 1, comprising:
   a fastening for sealing a periphery of the down conductor.

4. Protective cover according to claim 1, comprising:
   an elastic property to hold the protective cover in place on the lightning arrester by clamping the protective cover on the active portion of the lightning arrester.

5. Protective cover according to claim 1, comprising:
   an annular projection on an inner face of the protective cover arranged on the active portion of the lightning arrester, said annular projection being provided for being housed in a corresponding groove of the active portion of the lightning arrester for fastening the protective cover on the lightning arrester.

6. Protective cover according to claim 1, wherein the protective cover is made of EPDM and/or silicone.

7. Protective cover according to claim 1, comprising:
   at least one depression in an inner face of a portion of the protective cover for engaging the down conductor of the lightning arrester and for draining condensation which forms in the spark gap out of the protective cover.

8. Protective cover according to claim 1, which is dimensioned such that an isolation distance through air between the active portion and the down conductor of the lightning arrester on an outside of the protective cover is greater than or equal to twice an isolation distance of the spark gap with air.

9. Protective cover according to claim 1, formed as one part, the protective cover being configured for discharging expanded air from the spark gap, upon triggering thereof due to lightning current, to an environment outside the spark gap.

10. Protective cover according to claim 9, configured for discharging the expanded air by passage thereof between the protective cover and the down conductor.

11. Protective cover according to claim 10, comprising:
   an elastic property for elastic deformation of the protective cover as a result of expanded air in the spark gap upon triggering thereof by lightning current for passing the expanded air between the protective cover and the down conductor.

12. Protective cover according to claim 1, comprising:
   separately formed first and second parts, the first part being fastened on the active portion of the lightning arrester and the second part being fastened on the down conductor of the lightning arrester, the first and second parts being joined together to form the protective cover, the first and second parts being configured for separation by expanding air in the spark gap upon triggering thereof by lightning current.

13. Protective cover according to claim 12, wherein the second part is configured for changing position under an effect of the expanded air in the spark gap upon triggering by the lightning current, for displaying an occurrence of a lightning strike on the lightning arrester as a result of a changing position.

14. Protective cover according to claim 12, wherein the second part is configured for turning over the down conductor under an effect of the expanded air in the spark gap upon triggering by the lightning current, and for displaying an occurrence of a lightning strike on the lightning arrester.

15. Protective cover according to claim 12, wherein the first part forms a bell-shape inside of which the dielectric portion and the spark gap with air are arranged when the first part is fastened to the active portion of the lightning arrester.

16. The protective cover according to claim 1, included in a combination of a kit comprising:
   a lightening arrester with an early streamer emission device, the protective cover being configured for fastening to the lightning arrester to protect the spark gap of the lightning arrester against degradation of dielectric properties by an environment of the spark gap, while leaving an active portion of the lightning arrester exposed to the environment.

17. An assembly, comprising:
   an early streamer emission device;
   an active portion of a lightning arrester connected to the early streamer emission device for promoting triggering of an upward leader starting from the active portion;
   a down conductor for connection to ground;

a dielectric portion for mounting the active portion on the down conductor, the active portion being separated from the down conductor by an air space to form a spark gap with air through which lightning current will pass from the active portion to the down conductor; and a protective cover fastened to the lightning arrester to protect the spark gap against degradation of dielectric properties by an environment of the spark gap, the active portion of the lightning arrester being exposed to the environment.

18. The assembly according to claim 17, wherein the protective cover includes a first portion for fastening to the active portion, and a second portion for fastening to the down conductor, the first and second portions being formed as a single structure.

19. The assembly according to claim 17, wherein the protective cover includes a first portion for fastening to the active portion, and a second portion for fastening to the down conductor, the first and second portions being formed as two separately formed parts.

20. A protective cover according to claim 4, wherein the protective cover is also clamped on the down conductor.

* * * * *